United States Patent Office 2,889,355
Patented June 2, 1959

2,889,355

HYDROPHENANTHRYL-CARBOXYLIC ACIDS AND ESTERS AND PROCESS FOR PREPARING SAME

Leopold Ruzicka and Hans Heusser, Zurich, Switzerland, assignors to Ciba Pharmaceutical Products, Inc., Summit, N.J.

No Drawing. Application May 18, 1955
Serial No. 509,393

Claims priority, application Switzerland May 26, 1954

9 Claims. (Cl. 260—468.5)

This invention relates to hydrophenanthryl-carboxylic acids of which the ring C has the structure

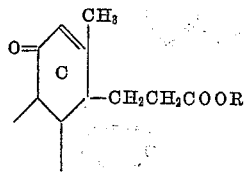

in which R represents hydrogen or a lower alkyl group, e.g., methyl, ethyl, propyl and the like. More particularly, the invention relates to $\Delta^2$-2,13-dimethyl-4-keto-dodecahydrophenanthryl-(1)-propionic acids and the esters thereof, and the process for their preparation.

In general, the process involves treating a steroid lactam containing rings C and D having the structure

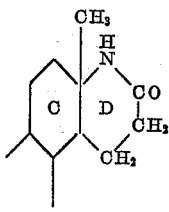

with a basic agent, preferably an alkali metal hydroxide, for example, sodium hydroxide or potassium hydroxide. The treatment with the basic agent is advantageously carried out at a raised temperature and under pressure, in the presence of a solvent, such as an alcohol.

The steroid lactams used as starting materials may contain further substituents, for example, free or functionally converted hydroxyl or oxo groups, for example, esterified or etherified or enolized or ketalized hydroxyl or oxo groups, especially all in the 3-position. They may also contain double bonds, for example, starting from the 5-carbon atom, that is to say, in the 4,5- or 5,6-position. In order to prepare the steroid lactams the corresponding substituted 11,17-dioxo-testane compounds are converted into the 17-monoximes, and the latter are subjected to a Beckmann rearrangement.

The products are useful as intermediate products.

The following diagram shows the synthesis of aldosterone starting with the hydrophenanthryl-carboxylic acids:

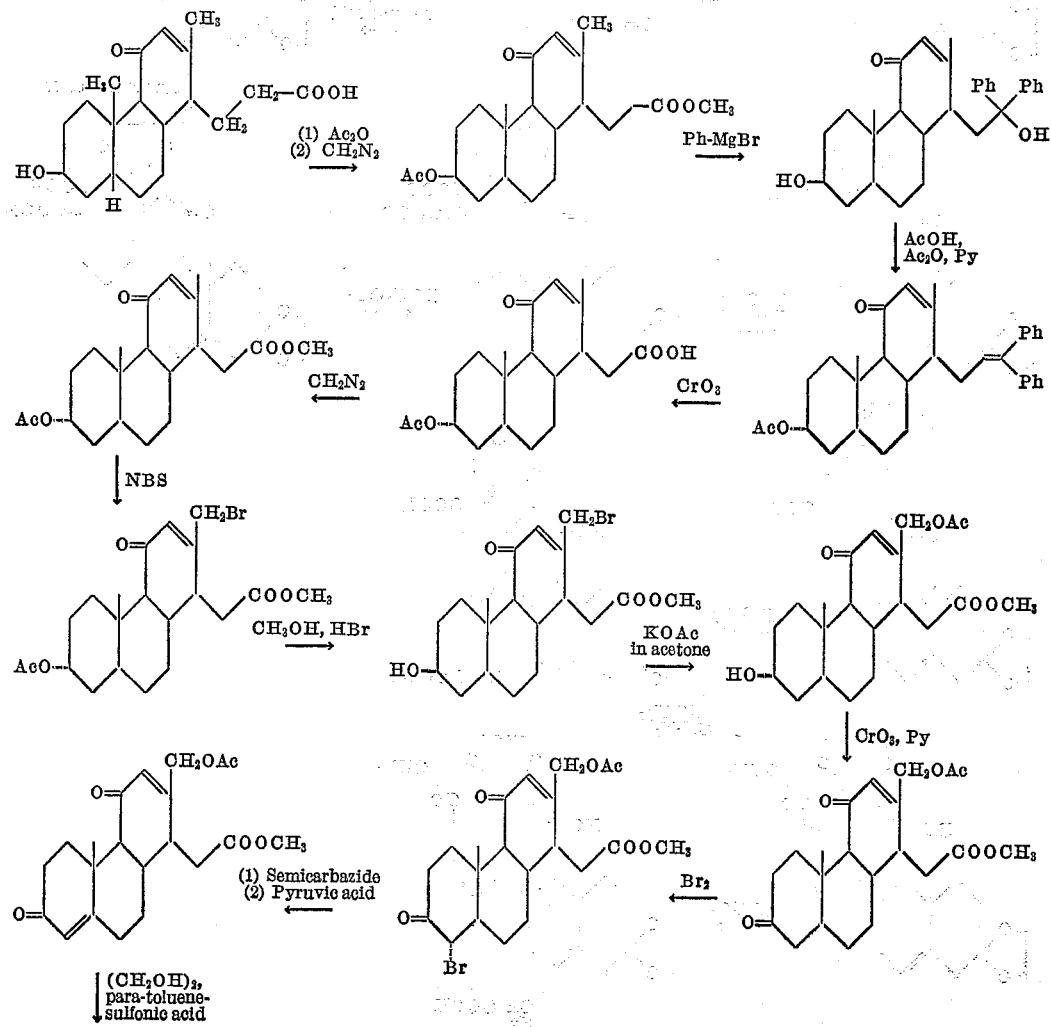

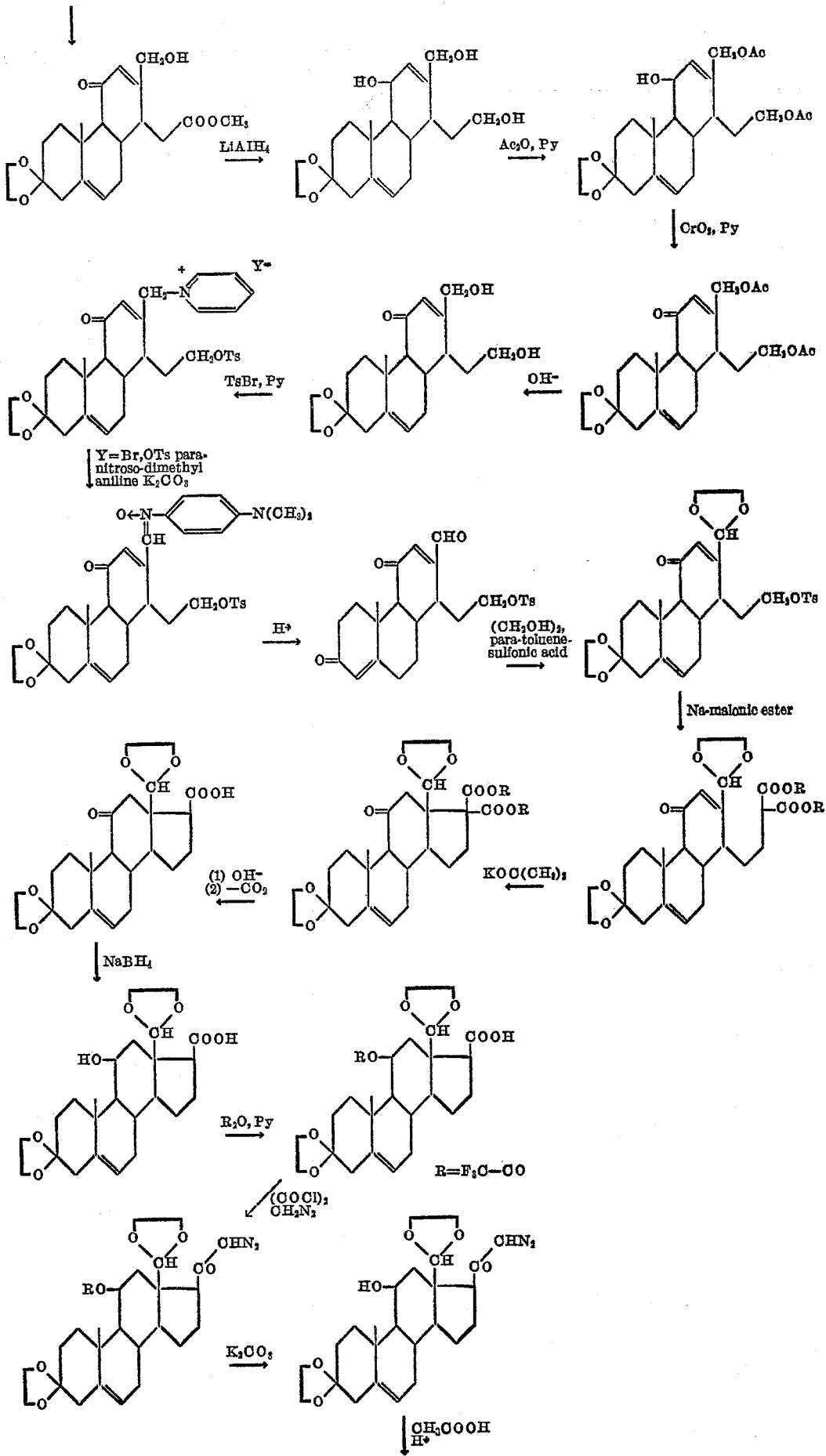

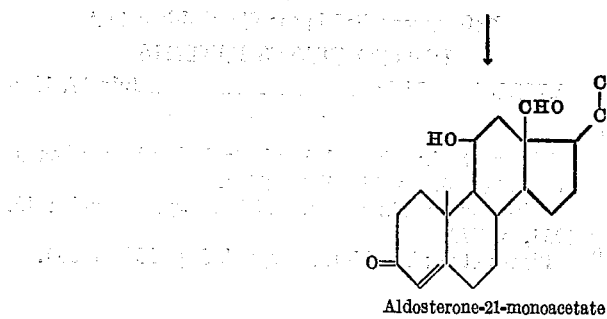

Aldosterone-21-monoacetate

The following example illustrates the invention, the parts being by weight unless otherwise stated, and the relationship of parts by weight to parts by volume being the same as that of the gram to the cubic centimeter:

*Example*

1 part of 3α-acetoxy-11,17-diketo-17a-aza-D-homo-testane is heated in 150 parts by volume of an alcoholic solution of caustic potash of 10 percent strength for 5 hours in a pressure vessel at 150° C. The solution is then acidified with 2N-hydrochloric acid (pH=3–4) and concentrated to a considerable extent in vacuo. After adding sodium sulfate, the reaction product is extracted with chloroform. The chloroform extract yields 0.95 part of a crude product, which exhibits in the ultraviolet spectrum a characteristic absorption at 238 mμ (log ε=4.05). Separation of this crude product into acids and neutral bodies yields 0.9 part of pure Δ²-2,13-dimethyl - 4 - keto - 7α - hydroxy - dodecahydrophenanthryl-(1)-propionic acid, which exhibits in the ultraviolet spectrum an absorption maximum at 238 mμ (log ε=4.05). The acid can be obtained only with difficulty in a crystalline form. After drying it in a high vacuum the amorphous mass melts at 80–95° C.

By esterifying the above acid with an ethereal solution of diazo-methane, there is obtained Δ²-2,13-dimethyl-4-keto-7α-hydroxy-dodecahydrophenanthryl-(1) - propionic acid methyl ester.

The above starting material can be prepared as follows:

1 part of 3α-acetoxy-11,17-diketo-testane melting at 61° C. is heated at the boil for 2 hours in 20 parts by volume of a solution of hydroxylamine acetate in ethanol (prepared by boiling 1 part of hydroxylamine hydrochloride, 2 parts of sodium acetate and 20 parts by volume of ethanol for a short time and then filtering). The solution is then evaporated to one half of its volume, mixed with 50 parts by volume of water, and then the oxime is separated out first in an amorphous form and then in a crystalline form. The precipitate is filtered off with suction, washed with a mixture of water and methanol (2:1) and then dried by evaporation with benzene in vacuo. The yield amounts to 1.03 part of a crude product melting at 188° C. By recrystallization from a mixture of acetone and hexane, the 3α-acetoxy-11,17-diketo-testane-17-monoxime is obtained in well formed needles melting at 194° C.

1 part of 3α-acetoxy-11,17-diketo-testane-17-monoxime is dissolved in 40 parts by volume of absolute pyridine, mixed with 1 part of para-acetylamino-benzene sulfonic acid chloride and the whole is heated for 2 hours at 70° C. The reaction mixture is then mixed with 120 parts by volume of water, and heated on the water bath for a further 2 hours. By the addition of water the total volume is made up to 240 parts by volume, and the mixture is acidified with 2N-sulfuric acid while cooling. Extraction with a mixture of ether and chloroform (3:1) yields 1 part of a crystalline crude product, which melts at 292° C. By recrystallization of the 3α-acetoxy-11,17-diketo-17a-aza-D-homo-testane from methanol there are obtained needles which melt at 311° C. The compound exhibits in the infra-red spectrum in the 1700 centimeter⁻¹- region characteristic absorption bands at 1733, 1706, 1678, 1631 and 1603 cm.⁻¹.

What is claimed is:
1. Hydrophenanthryl compounds having the general formula:

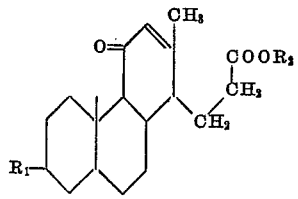

wherein $R_1$ is a member selected from the group consisting of a free and an esterified hydroxyl group, and $R_2$ is a member selected from the group consisting of hydrogen and lower alkyl.

2. A compound of the structural formula:

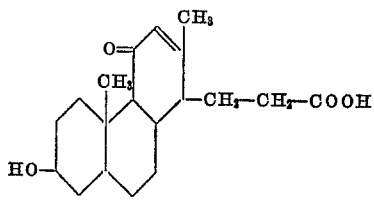

3. Δ²-2,13 - dimethyl-4-keto-7α-hydroxy-dodecahydrophenanthryl-(1)-propionic acid.
4. Δ²-2,13-dimethyl-4-keto-7α-hydroxy - dodecahydrophenanthryl-(1)-propionic acid lower alkyl ester.
5. Δ²-2,13-dimethyl-4-keto-7α-hydroxy - dodecahydrophenanthryl-(1)-propionic acid methyl ester.

6. A process which comprises treating a compound of the formula

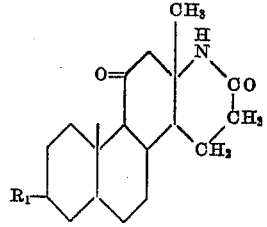

wherein $R_1$ is a member selected from the group consisting of a free and an esterified hydroxyl group, with a basic agent selected from the group consisting of an alkali metal hydroxide and an alkali metal alcoholate so as to produce a hydrophenanthryl-(1)-propionic acid of the formula

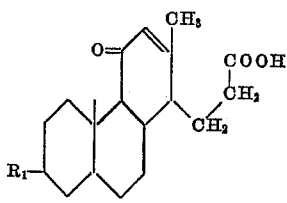

wherein $R_1$ has the meaning given above.

7. A process in accordance with claim 6, wherein the reaction is carried out at a temperature of about 150° C. in a closed reaction vessel.

8. A process in accordance with claim 6, wherein the propionic acid compound is esterified.

9. A process which comprises treating 3-acetoxy-11,17-diketo-17α-aza-D-homo-testane with an alcoholic solution of caustic potash so as to produce $\Delta^2$-2,13-dimethyl-4-keto-7α-hydroxy - dodecahydrophenanthryl - (1) - propionic acid.

References Cited in the file of this patent

UNITED STATES PATENTS 2,755,289    Picha _____ July 17, 1956

OTHER REFERENCES

Fieser et al.: Natural Products Related to Phenanthrene, 3rd ed., pp. 646–670 (1949).

Friedmann et al.: Chem. and Industry, September 15, 1951, p. 777.

Pincus et al.: The Hormones, vol. 3, p. 538 (1955).

UNITED STATES PATENT OFFICE
CERTIFICATE OF CORRECTION

Patent No. 2,889,355                                                       June 2, 1959

Leopold Ruzicka et al

It is hereby certified that error appears in the printed specification of the above numbered patent requiring correction and that the said Letters Patent should read as corrected below.

Column 2, line 21, after "especially" strike out "all".

Signed and sealed this 6th day of October 1959.

(SEAL)
Attest:

KARL H. AXLINE                                          ROBERT C. WATSON
Attesting Officer                                      Commissioner of Patents